United States Patent [19]
Svensson

[11] 3,871,780
[45] Mar. 18, 1975

[54] DEVICE FOR LOCKING TWO CONCENTRICALLY POSITIONED AND AXIALLY DISPLACEABLE MEMBERS

[75] Inventor: Jon-Erik Svensson, Skillingaryd, Sweden

[73] Assignee: Skillingaryds Mekaniska AB, Skillingaryd, Sweden

[22] Filed: Nov. 5, 1973

[21] Appl. No.: 412,714

[30] Foreign Application Priority Data
Nov. 3, 1972 Sweden.............................. 14258/72

[52] U.S. Cl................................. 403/104, 248/411
[51] Int. Cl............................................. F16b 7/14
[58] Field of Search ............ 403/104, 105; 248/355, 248/411, 412

[56] References Cited
UNITED STATES PATENTS

| 581,136 | 4/1897 | Preece | 248/412 |
| 1,031,637 | 7/1912 | Fischer | 403/104 X |
| 2,010,292 | 8/1935 | Campbell | 248/412 |
| 2,010,306 | 8/1935 | Leech | 248/412 |
| 2,710,048 | 6/1955 | Dawson | 248/412 |
| 3,502,358 | 3/1970 | Alspaugh et al. | 403/105 |

Primary Examiner—Andrew V. Kundrat
Attorney, Agent, or Firm—Howson and Howson

[57] ABSTRACT

A device for locking two concentrically positioned and axially displaceable members against displacement in one direction, characterized by a recess formed in one of said members and opening in the direction of the second member, and by locking elements located in said recess, said recess having a first part with a bottom portion positioned at a greater distance from said second member than the distance corresponding to the size of the locking elements in a direction transversally to the axial direction of said members, and a second part of said recess having a bottom portion decreasing its distance to said second member in the axial direction of said members and from the first mentioned bottom portion to a distance less than the distance corresponding to the size of the locking elements in said direction transversally to the axial direction of the members, whereby the locking elements are free from locking engagement between said elements, when located in said first part of recess and engaging said members for locking the members against displacement in at least one direction, when located in said second part of recess, and by an actuating element for displacing the locking elements between said parts of recess.

3 Claims, 2 Drawing Figures

PATENTED MAR 18 1975    3,871,780

DEVICE FOR LOCKING TWO CONCENTRICALLY POSITIONED AND AXIALLY DISPLACEABLE MEMBERS

BACKGROUND OF THE INVENTION

The present invention relates to a device comprising at least two concentrically positioned members which are axially displaceable relative to one another and including means for locking the members against displacement in at least one axial direction.

The device of the present invention which is adjustable and may be locked in any desired position may be employed as part of the support structure for tables, chairs, and similar articles to facilitate adjustment of the table top or chair seat at various height levels. Extensible support members of this type are commonly known but presently existing devices are comparatively complicated and expensive in construction. Additionally, some of the known devices are of questionable reliability and are often difficult to adjust in a simple manner. Further, it has been found that in some of these prior devices the parts become worn over a comparatively short period of use and no longer function properly to permit adjustment and locking in a desired position.

SUMMARY OF THE INVENTION

With the foregoing in mind, it is an object of the present invention to provide an extensible adjustable support device which is of comparatively simplified construction, is easy and economical to manufacture and is reliable in operation. To this end the device of the present invention is characterized by a recess in one of the concentrically positioned and axially displaceable members forming a pocket for a plurality of locking elements which in the illustrated embodiment, consists of a plurality of rolling elements. The recess comprises a first portion of a predetermined cross sectional dimension so that when the locking elements are disposed therein the members may be freely moved axially relative to one another and a second portion of reduced cross sectional dimension so that when the locking elements are disposed therein the members are fixed or locked relative to one another by a wedging action between the members. The device further includes an actuating element preferably supported in the first member which may be in the form of a sleeve for positioning the locking elements selectively between the first and second portion of the recess. The second member is provided with shifter elements adjacent opposite axial ends thereof operable for selectively positioning said actuating element between a locking position and an adjusting position.

BRIEF DESCRIPTION OF THE FIGURES

These and other objects of the present invention and the various features and details of the operation and construction thereof are hereinafter more fully set forth with reference to the accompanying drawing wherein.

DESCRIPTION OF A SPECIFIC EMBODIMENT

Figure 1:
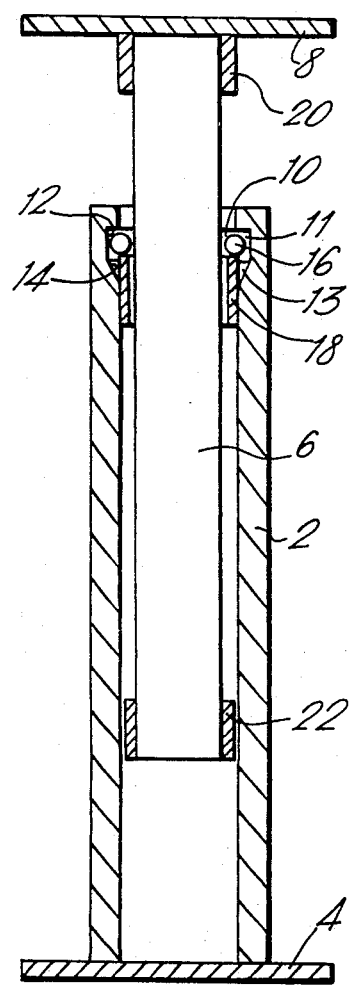
FIG. 1 is a sectional view illustrating an extensible support device in accordance with the present invention with the locking elements disposed in a nonlocking or adjusting position.

The device according to the present invention comprises an elongated outer tubular member 2 supporting at one axial end a plate member 4 and an inner rod 6 telescopically mounted in said tubular member and supporting at its outer terminal end a second plate member 8. The plate 4 may be secured by suitable fastening means, for example, to a leg of a table, chair or the like, and the second plate 8 may be secured by suitable fastening means to a tabletop or chair seat.

Figure 2:
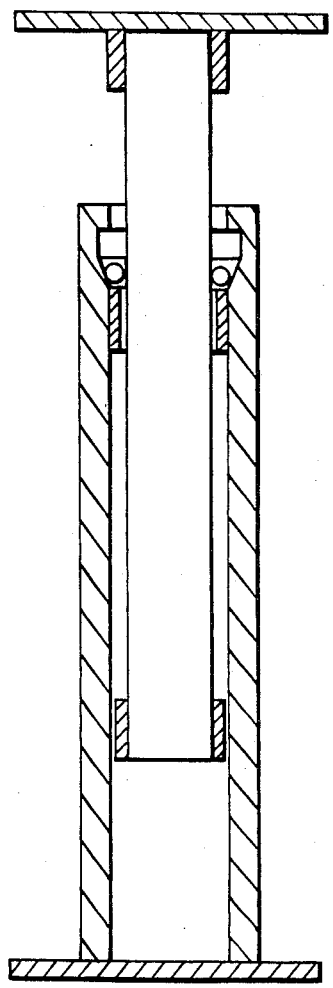
FIG. 2 is a transverse sectional view illustrating the extensible device in a position wherein the locking elements are disposed in a position to lock the extensible members in a selected position relative to one another.

In accordance with the present invention, the rod 6 is displaceable relative to the tubular member 2 and means is provided for locking the members in any desired position. To this end the tubular member 2 is formed with an internal annular pocket or recess 10 adjacent its upper terminal end having a first section 11 defined by a generally cylindrical side wall 12 and a second section 13 defined by an inwardly converging conical wall 14. A plurality of locking elements which in the illustrated embodiment comprise balls 16 are located in the pocket 10 and are of a predetermined diametral dimension so that there is a radial clearance between the balls 16, side wall 14 and rod member 6 when the locking elements are in the first section of the recess permitting free relative axial displacement between the tubular member 2 and the rod 6. When the locking elements are located in the second section 13 of the pocket 10, they are wedged against the peripheral surface of the rod as illustrated in FIG. 2 to lock the rod 6 against downward displacement relative to the tubular member 2.

The assembly further includes an actuating element for selectively positioning the rolling elements in the recess 10. The actuating element is in the form of a sleeve 18 which is preferably slotted interiorly of the tubular member and is actuatable axially thereof between an upper limit position (FIG. 1) positioning the rolling elements in the first section 11 of the pocket whereby relative axial displacement of the rod and tubular member is permitted and a lower limit position (FIG. 2) wherein the locking elements are disposed in the second section 13 and the rod 6 is locked against downward displacement in the tubular member.

In accordance with the present invention, the actuating element 18 is adapted for displacement to position the locking elements 16 between a locking position (FIG. 2) and a release position (FIG. 1) by a pair of shifter elements 20 and 22 which, in the present instance, are in the form of sleeves secured to the rod 6 at opposite axial ends thereof. The sleeve 20 is of a size to freely engage in the annular space between the tubular member 2 and the rod so that when the rod is displaced downwardly the lower axial end face of the sleeve 20 engages the rolling elements thereby displacing the shifter element 18 downwardly. The lower shifter element 22 is also in the form of a sleeve of a diametral dimension to provide a clearance between the sleeve 22 and the internal peripheral surface of the tubular member 2 and is adapted to engage the lower end of the actuating element 18 upon actuation of the rod 6 upwardly to position the locking elements in a first section 11 of the pocket 10.

In the present instance, the balls are freely moveable in the pocket. However, if desired, the shifter element 18 may be provided with a series of circumferentially spaced radial openings for the balls in which event a fewer number of balls may be used.

Considering now the operation of the device, assume that the parts are in the position illustrated in FIG. 2 whereby the rod 6 is locked against downward displacement relative to the tubular member 2 by the wedging action of the balls 16 between the conical wall 14 of the pocket 10 and the peripheral surface of the rod. From this position the rod 6 may be extended upwardly to a new location. However, when it is desired to adjust the position of the rod 6 downwardly with respect to the tubular member 2, the rod 6 has to be fully extended so that the shifter element 22 engages the lower axial end face of the actuating element 18 to position the balls 16 in the first section of the pocket 10. (FIG. 1) In this position the rod is freely moveable in either axial direction relative to the tubular member 2. With the locking elements thus located, the rod 6 is moved downwardly so that the shifter element 20 engages the balls and displaces the sleeve 18 to the position shown in FIG. 2. Now the rod may be extended to a selected height at which point the locking elements will maintain the rod in the desired fixed position in the manner described above.

What is claimed is:

1. A device for locking two concentrically positioned and axially displaceable members against displacement in one direction, characterized by a recess formed in one of said members adjacent the open end thereof and opening in the direction of the second member, and by locking elements located in said recess and contiguous with said open end, said recess having a first part with a bottom portion positioned at a greater distance from said second member than the distance corresponding to the size of the locking elements in a direction transversely to the axial direction of said members, and a second part of said recess having a bottom portion decreasing its distance to said second member away from said open end in the axial direction of said members and from the first mentioned bottom portion to a distance less than the distance corresponding to the size of the locking elements in said direction transversally to the axial direction of the members, said locking elements being free from locking engagement between said elements when located in said first part of recess and engaging said members for locking the members against displacement in at least one axial direction when located in said second part of recess, and an actuating element in the form of a sleeve snugly and slidably engaged in said one member for actuation axially therein and adapted to engage the locking elements from one axial direction and displace the locking elements between said parts of said recess, a first shifter element in the form of an annular member secured to said second member adjacent one axial end thereof diameter smaller than said open end so as to be slidable therein and engageable through said recess in said one member and having a length adequate to allow direct contact with said locking elements from the opposite axial direction to displace said actuating element in one axial direction to permit said locking elements to assume a locking position and a second shifter element secured to said second member adjacent its opposite axial end spaced from said one member and engageable with said actuating element to displace it in an opposite axial direction whereby said locking elements are displaced to a non-locking position.

2. A device in accordance with claim 1, characterized in that the actuating element consists of a sleeve connected with said one member with a close fit.

3. A device in accordance with claim 1, characterized in that the locking elements comprises rolling elements.

* * * * *